(12) United States Patent
Cheng et al.

(10) Patent No.: US 12,098,223 B2
(45) Date of Patent: Sep. 24, 2024

(54) LIVING RADICAL POLYMERIZATION METHOD USING ZINC PHTHALOCYANINE DYE AS NEAR-INFRARED PHOTOCATALYST

(71) Applicant: SOOCHOW UNIVERSITY, Suzhou (CN)

(72) Inventors: Zhenping Cheng, Suzhou (CN); Chun Tian, Suzhou (CN); Lifen Zhang, Suzhou (CN); Xiulin Zhu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 635 days.

(21) Appl. No.: 17/427,640

(22) PCT Filed: Aug. 20, 2020

(86) PCT No.: PCT/CN2020/110118
§ 371 (c)(1),
(2) Date: Jul. 31, 2021

(87) PCT Pub. No.: WO2022/021499
PCT Pub. Date: Feb. 3, 2022

(65) Prior Publication Data
US 2022/0325008 A1    Oct. 13, 2022

(30) Foreign Application Priority Data
Jul. 29, 2020   (CN) .......................... 202010745119.7

(51) Int. Cl.
*C08F 2/38* (2006.01)
*C08F 2/46* (2006.01)
(Continued)

(52) U.S. Cl.
CPC .................. *C08F 2/38* (2013.01); *C08F 2/46* (2013.01); *C08F 4/50* (2013.01); *C08F 220/14* (2013.01);
(Continued)

(58) Field of Classification Search
CPC ...... C08F 2/38; C08F 2/46; C08F 4/50; C08F 220/14; C08F 220/286; C08F 220/54
See application file for complete search history.

(56) References Cited

U.S. PATENT DOCUMENTS

2013/0090442 A1    4/2013   Pugh et al.

FOREIGN PATENT DOCUMENTS

| CN | 103193912 A | 7/2013 |
|---|---|---|
| CN | 103242526 A | 8/2013 |
| EP | 2308932 A1 | 4/2011 |

OTHER PUBLICATIONS

Hua et al., "Research development of organic sulfides in living/controlled free-radical polymerization" Huaxue Tongbao (Chemistry) 2003, No. 3, pp. 162-168 (Dec. 31, 2003).

*Primary Examiner* — Catherine S Branch
(74) *Attorney, Agent, or Firm* — SZDC Law PC

(57) ABSTRACT

The invention provides a living radical polymerization method using a zinc phthalocyanine dye as a near-infrared photocatalyst, including subjecting a free radical polymerizable monomer to a near-infrared light-controlled polymerization reaction, in the presence of a chain transfer agent, a cocatalyst and a zinc phthalocyanine dye containing a carbon-carbon double bond, in a solvent at 0-30° C. under the air atmosphere, to obtain a living radical polymerization product. The free radical polymerizable monomer is an acrylate monomer, a methacrylate monomer, an acrylamide monomer or a methacrylamide monomer; the chain transfer agent includes a thiocarbonate; and the cocatalyst includes an organic amine with or without a carbon-carbon double (Continued)

Chemical Shift (ppm)

bond. A near-infrared light-responsive functional zinc phthalocyanine dye is used as a near-infrared photocatalyst for the polymerization reaction, and after the polymerization is completed, the polymerizable zinc phthalocyanine dye remains on the polymer chain by polymerization, thereby realizing the cyclic utilization of the near-infrared photocatalyst.

10 Claims, 7 Drawing Sheets

(51) Int. Cl.
  *C08F 4/50*    (2006.01)
  *C08F 220/14*   (2006.01)
  *C08F 220/28*   (2006.01)
  *C08F 220/54*   (2006.01)
  *C08F 230/04*   (2006.01)

(52) U.S. Cl.
  CPC ........ *C08F 220/286* (2020.02); *C08F 230/04* (2013.01); *C08F 2438/03* (2013.01)

LIVING RADICAL POLYMERIZATION METHOD USING ZINC PHTHALOCYANINE DYE AS NEAR-INFRARED PHOTOCATALYST

This application is the National Stage Application of PCT/CN2020/110118, filed on Aug. 20, 2020, which claims priority to Chinese Patent Application No. 202010745119.7, filed on Jul. 29, 2020, which is incorporated by reference for all purposes as if fully set forth herein.

FIELD OF THE INVENTION

The present invention relates to the technical field of polymer preparation, and more particularly to a living radical polymerization method using a zinc phthalocyanine dye as a near-infrared photocatalyst.

DESCRIPTION OF THE RELATED ART

Nowadays, a variety of reversible-deactivation radical polymerization methods based on the reversible balance between active and dormant species have been widely studied and reported, and photocatalytic polymerization systems have found use in the synthesis of many functional polymer materials due to their excellent spatiotemporal controllability. However, the photocatalytic polymerization systems generally suffer from limitations from photocatalysts, because there are fewer catalysts that can be used in polymerization systems. The synthesis, storage and use conditions of catalysts are also issues that need to be solved urgently. In addition, the presence of oxygen has important impact in chemical synthesis sometimes. For example, it provides a rich source of oxidant, but also brings many adverse effects. The inhibition of oxygen on free radical polymerization needs to be removed by a physical process (for example, by reaction under a nitrogen atmosphere) or a chemical means (for example, by capturing photosensitive singlet oxygen).

Visible light-induced free radical polymerization is a powerful strategy for the synthesis of functional polymers and nanomaterials. A variety of light-induced reversible-inactivation free radical polymerization strategies have been reported, nitroxide-mediated radical polymerization, atom transfer radical polymerization, reversible addition-fragmentation chain transfer polymerization, iodine transfer polymerization and other light-induced free radical polymerization strategies. In these light-induced strategies, the most important condition to achieve polymerization is that the polymerization system is able to effectively absorb light energy. This generally requires the addition of a photoinitiator, a photosensitizer or a photocatalyst to the system. These light absorbing compounds include peroxide initiators, transition metal salts, porphyrin compounds, phthalocyanines, organic amines and other organic photo-redox agents. In the presence of these catalysts absorbing light in the range of visible light and even near-infrared light, a series of related studies are reported. Polymerization methods have been developed for these systems to solve some of the problems in the previous polymerization systems. However, the use of various catalysts not only increases the cost of polymerization, but also causes waste due to the fact that the catalyst is discarded after the polymerization is completed. Therefore, there is an urgent need to develop a new method to improve the reusing rate of the catalyst.

CN201210451694.1 and CN201310138388.7 respectively disclose a method for preparing a light-responsive hyperbranched zinc phthalocyanine polymer, and a polymer containing a zinc phthalocyanine group on the side chain and a method for preparing the same. In the above two methods, a phthalocyanine compound is introduced into the polymer backbone to improve the solubility and processability of the phthalocyanine polymer and improve the photoelectric performance of the material. However, the photoconversion performance of the phthalocyanine compound is not used, and the reaction product is not "living".

SUMMARY OF THE INVENTION

To solve the above technical problem, an object of the present invention is to provide a living radical polymerization method using a zinc phthalocyanine dye as a near-infrared photocatalyst. In the present invention, a near-infrared light-responsive functional zinc phthalocyanine dye is used as a near-infrared photocatalyst for the polymerization reaction, and after the polymerization is completed, the polymerizable zinc phthalocyanine dye remains on the polymer chain by polymerization, thereby realizing the cyclic utilization of the near-infrared photocatalyst.

A first object of the present invention is to provide a near-infrared light-controlled living radical polymerization method, which comprises the following steps:

subjecting a free radical polymerizable monomer to a near-infrared light-controlled polymerization reaction, in the presence of a chain transfer agent, a cocatalyst and a zinc phthalocyanine dye with a carbon-carbon double bond as a catalyst, in a solvent at 0-30° C. under the air atmosphere, to obtain a living radical polymerization product after complete reaction.

The free radical polymerizable monomer is selected from an acrylate monomer, a methacrylate monomer, an acrylamide monomer or a methacrylamide monomer.

The chain transfer agent includes a thiocarbonate.

The cocatalyst includes an organic amine with a carbon-carbon double bond or an organic amine without a carbon-carbon double bond.

The living radical polymerization product has a structure of Formula (1) or (2):

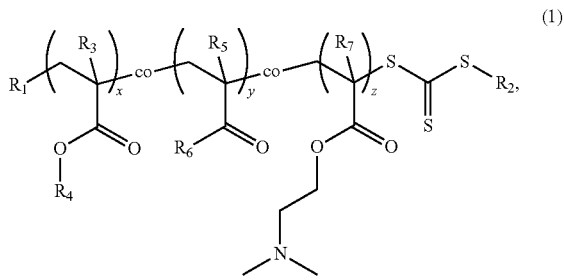

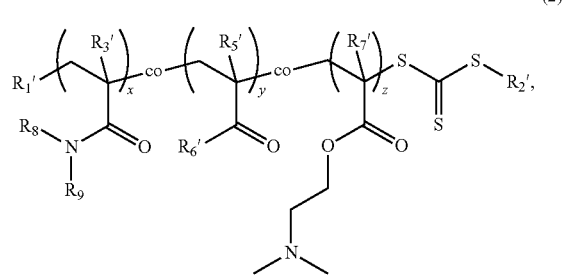

in which R1 and R1' are each independently selected from

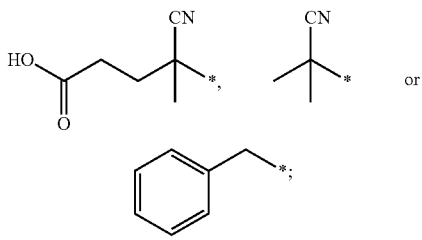

R2 and R2' are each independently selected from a C2-C12 alkyl group or a C2-C12 alkyl group substituted with carboxyl;

R3, R3', R5 and R5' are each independently selected from hydrogen or methyl;

R4 is selected from benzyl, a C1-C6 alkyl group, a C1-C6 alkyl group substituted with hydroxyl, a polyethylene glycol chain, a C1-C6 alkylene oxide, or a C1-C6 alkyl group substituted with dimethylamino;

R6 and R6' are each independently selected from

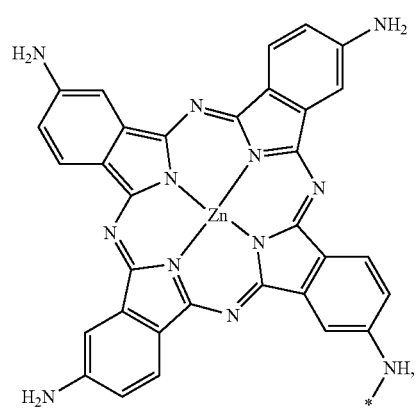

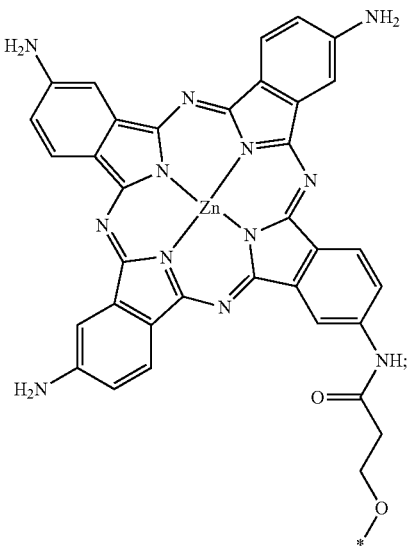

R7 and R7' are each independently selected from hydrogen or methyl;

R8 and R9 are each independently selected from hydrogen, a C1-C6 alkyl group, or a C1-C6 alkyl group substituted with hydroxyl; and x=3-1000; y is lower than 10; and z=0-20.

Preferably, when z=0, the cocatalyst is an organic amine without a carbon-carbon double bond; and the organic amine without a carbon-carbon double bond is triethylamine (TEA) and/or tributylamine (TBA).

Preferably when z=1-20, the cocatalyst comprises an organic amine with a carbon-carbon double bond; and the organic amine with a carbon-carbon double bond is dimethylaminoethyl acrylate (DMAEA) and/or dimethylaminoethyl methacrylate(DMAEMA). The structural formulas are shown below:

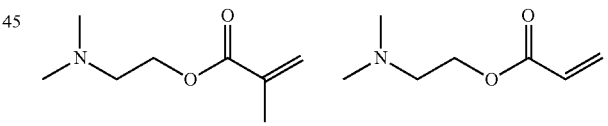

Preferably the cocatalyst is DMAEA.

Preferably, R2 and R2' are each independently selected from ethyl, n-dodecyl, or —CH$_2$CH$_2$COOH.

Preferably, R4 is selected from a group having a structural formula below:

—CH$_3$,

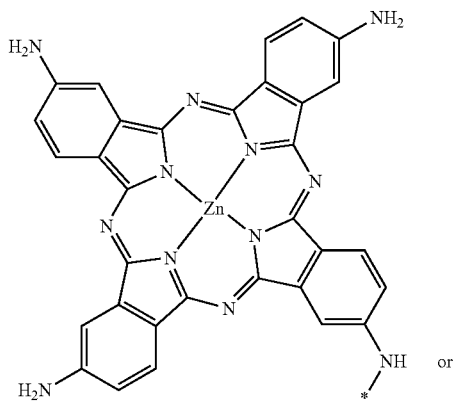

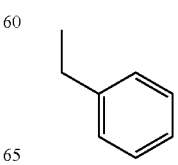 or

where n=5-22.

Preferably, $R_8$ and $R_9$ are each independently selected from hydrogen, methyl, ethyl, isopropyl or 2-hydroxypropyl.

Preferably, the molar ratio of the free radical polymerizable monomer to the zinc phthalocyanine dye is 1:0.00001-0.01. More preferably, the molar ratio is 1:0.0005-0.005.

Preferably, the molar ratio of the thiocarbonate to the cocatalyst is 1:0.5-20.

Preferably, the molar ratio of the free radical polymerizable monomer to the thiocarbonate is 10-1000:1-5. More preferably, the molar ratio is 10-200:1-5.

Preferably, the molar ratio of the thiocarbonate to the zinc phthalocyanine dye is 1:0.01-0.1. More preferably, the molar ratio is 1:0.01-0.05.

Preferably, the near-infrared light-controlled polymerization reaction takes place at a near-infrared light with a wavelength of 650-900 nm, which is emitted by an LED light source. Preferably, the light source is an LED lamp with a center wavelength of 730 nm.

Preferably, the acrylic monomer is methyl acrylate, tert-butyl acrylate, dimethylaminoethyl acrylate, n-butyl acrylate or polyethylene glycol acrylate (PEGA), the structural formulas of which are as follows:

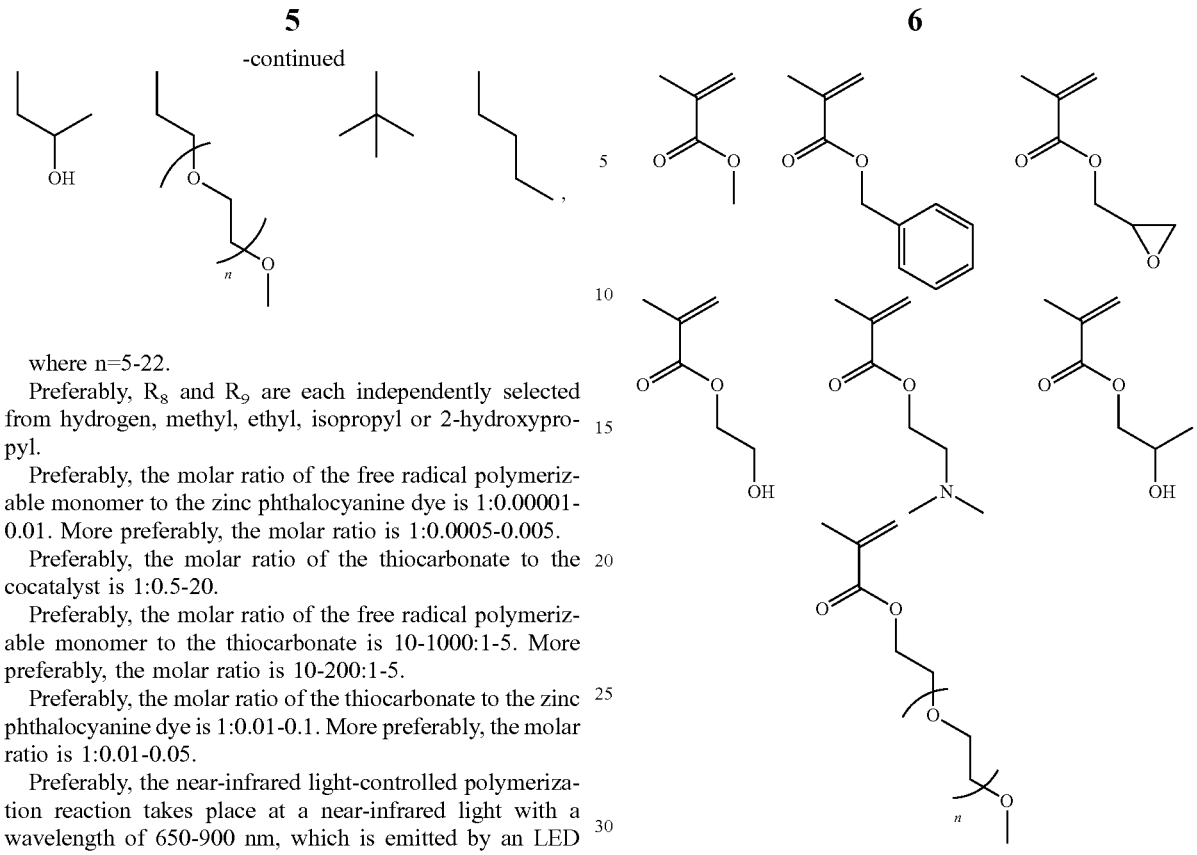

Preferably, the methacrylate monomer is selected from methyl methacrylate (MMA), benzyl methacrylate, glycidyl methacrylate, hydroxyethyl methacrylate, dimethylaminoethyl methacrylate, hydroxypropyl methacrylate, or polyethylene glycol methacrylate (PEGMA), the structural formulas of which are as follows:

Preferably, the acrylamide monomer or methacrylamide monomer is N,N-dimethylacrylamide, N,N-diethylacrylamide, N-isopropylacrylamide (NiPAAm) or 2-hydroxypropyl methacrylamide, the structural formulas of which are as follows:

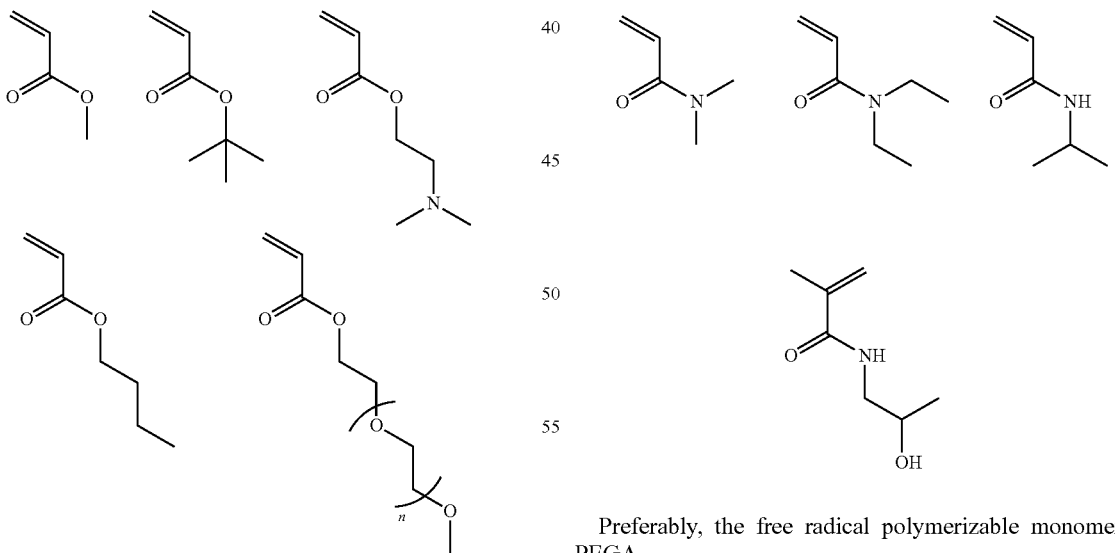

Preferably, the free radical polymerizable monomer is PEGA.

Preferably, the thiocarbonate is 4-cyano-4-[(dodecylsulfanylthiocarbonyl)sulfanyl]pentanoic acid (CDSPA), 4-cyano-4-[(ethylsulfanylthiocarbonyl)sulfanyl]pentanoic acid (CEPTA), S-(2-cyano-2-propyl)-S-dodecyltrithiocarbonate (CDCT) or 3-(benzylsulfanylthiocarbonylsulfanyl)propanoic acid (BTPA), the structural formulas of which are as follows:

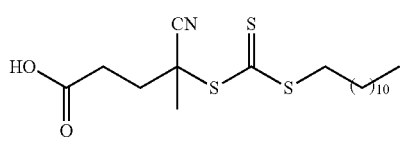

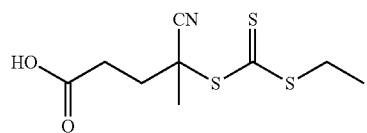

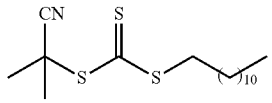

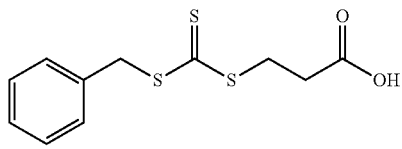

Preferably, the thiocarbonate chain transfer reagent is CDSPA.

Preferably, the zinc phthalocyanine dye is a zinc phthalocyanine dye monomer-methacrylamide (ZnTAPc-MAm), a zinc phthalocyanine dye monomer-acrylamide (ZnTAPc-Am), and a zinc phthalocyanine dye monomer-acrylate (ZnTAPc-A), the structural formulas of which are as follows:

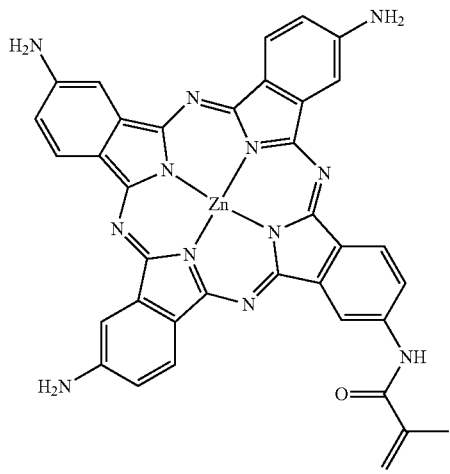

ZnTAPc-MAm

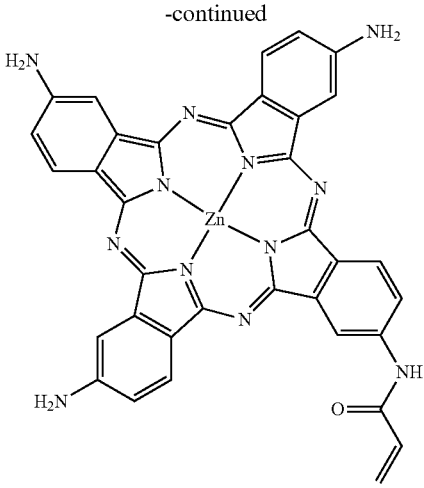

ZnTAPc-Am

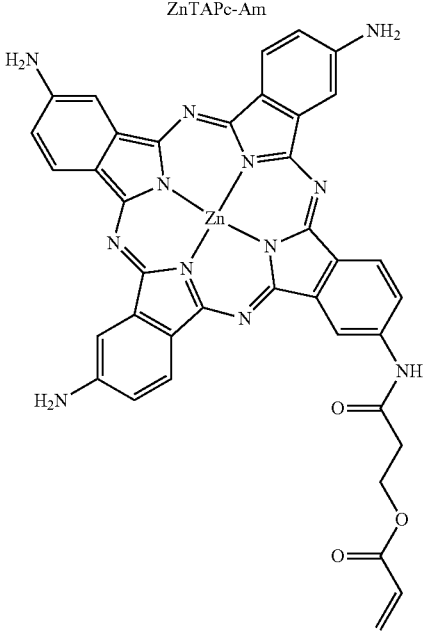

ZnTAPc-A

The zinc phthalocyanine dye compound is a polymerizable vinyl monomer. This zinc phthalocyanine dye can catalyze near-infrared light-induced RAFT polymerization in an air atmosphere. When the polymerizable monomer structure is catalyzed to polymerize for the first time in a highly polar solvent (such as DMSO), the catalyst will be covalently bonded to the synthesized polymer chain, thus avoiding the waste of catalyst and improving the utilization efficiency of the catalyst. This system provides a new idea of application for light-induced polymerization methodology.

Preferably, the zinc phthalocyanine dye is a zinc phthalocyanine dye monomer-acrylate (ZnTAPc-A).

Preferably, the solvent is selected from the group consisting of dimethyl sulfoxide, dimethyl formamide, 1,3-dimethyl-2-imidazolidinone, 1,4-dioxane, anhydrous methanol, anhydrous ethanol and water.

Preferably, the reaction time is 24 h or less, and the reaction is carried out in air. The conversion rate of the monomer can reach 84.6% when the reaction is irradiated with near-infrared light in the air for 5 h.

Preferably, the methacrylate monomer is polyethylene glycol acrylate, the thiocarbonate is 4-cyano-4-[(dodecylsulfanylthiocarbonyl)sulfanyl]pentanoic acid, a zinc phthalocyanine dye monomer-acrylate (ZnTAPc-A) is used as the near-infrared photocatalyst, and dimethylaminoethyl acrylate is the cocatalyst. The structural formula of the resulting polymer is as follows:

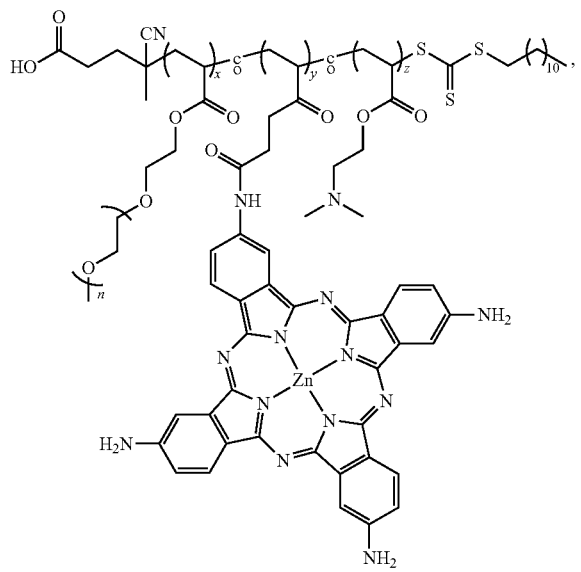

in which n=5–22; x=3–1000; y is 10 or less; and z=1–20.

A second object of the present invention is to provide a living radical polymerization product prepared by the above living radical polymerization method, which is represented by structural Formula (1) or (2), and has a molecular weight of 1,000 to 200,000 g/mol, and a molecular weight distribution of 1.07-1.5.

In the above mentioned groups, the position marked with * is the attachment point of the group.

By means of the above technical solution, the present invention has the following advantages.

In the present invention, a near-infrared light-responsive functional zinc phthalocyanine dye is used as a near-infrared photocatalyst for the polymerization reaction, with which reaction in the air is realized without removing oxygen. In this way, polymers with various structures are prepared by direct polymerization in the air, and the polymerization process has the characteristics of "living" radical polymerization. In the present invention, a monomer molecule of a free-radical polymerizable photocatalyst is used as the catalyst. In this way, a small amount of catalyst monomer molecules is copolymerized into the polymer chain, to control and recycle the free catalyst molecules. For example, cyclic catalysis or multifunctional applications in different scenarios is achieved.

In the present invention, a living radical polymerization method induced by near-infrared light at room temperature (0-30° C.) is used, which is a new simple polymerization method for synthesizing various polymer structures. With the preparation method of the present invention, the molecular weight of the polymer is controllable, and the molecular weight distribution is also narrow (Mw/Mn<1.5), conforming the characteristics of "living" radical polymerization. In the present invention, a polymerizable zinc phthalocyanine dye catalyst containing a carbon-carbon double bond is used, which remains on the polymer chain by polymerization, thereby realizing the cyclic utilization of the near-infrared photocatalyst.

The catalyst of the present invention is different from the catalyst in the traditional sense that does not participate in the reaction. The catalyst of the present invention is copolymerized into the polymer chain, while the performance of the catalyst to convert the near-infrared light into the energy needed to speed up the reaction process is not affected when used subsequently.

The living radical polymerization product obtained by the method of the present invention is a macromolecular chain transfer reagent, which continues to copolymerize with other free radical polymerizable monomer molecules. The reaction also takes place under irradiation with near-infrared light. The zinc phthalocyanine dye in the living radical polymerization product absorbs near-infrared light energy and converts the light energy into energy required for reaction to complete the copolymerization with other free radical polymerizable monomer molecules.

The above description is only a summary of the technical solutions of the present invention. To make the technical means of the present invention clearer and implementable in accordance with the disclosure of the specification, the preferred embodiments of the present invention will be described in detail with reference to the accompanying drawings.

DETAILED DESCRIPTION OF THE PREFERRED EMBODIMENTS

Figure 1:
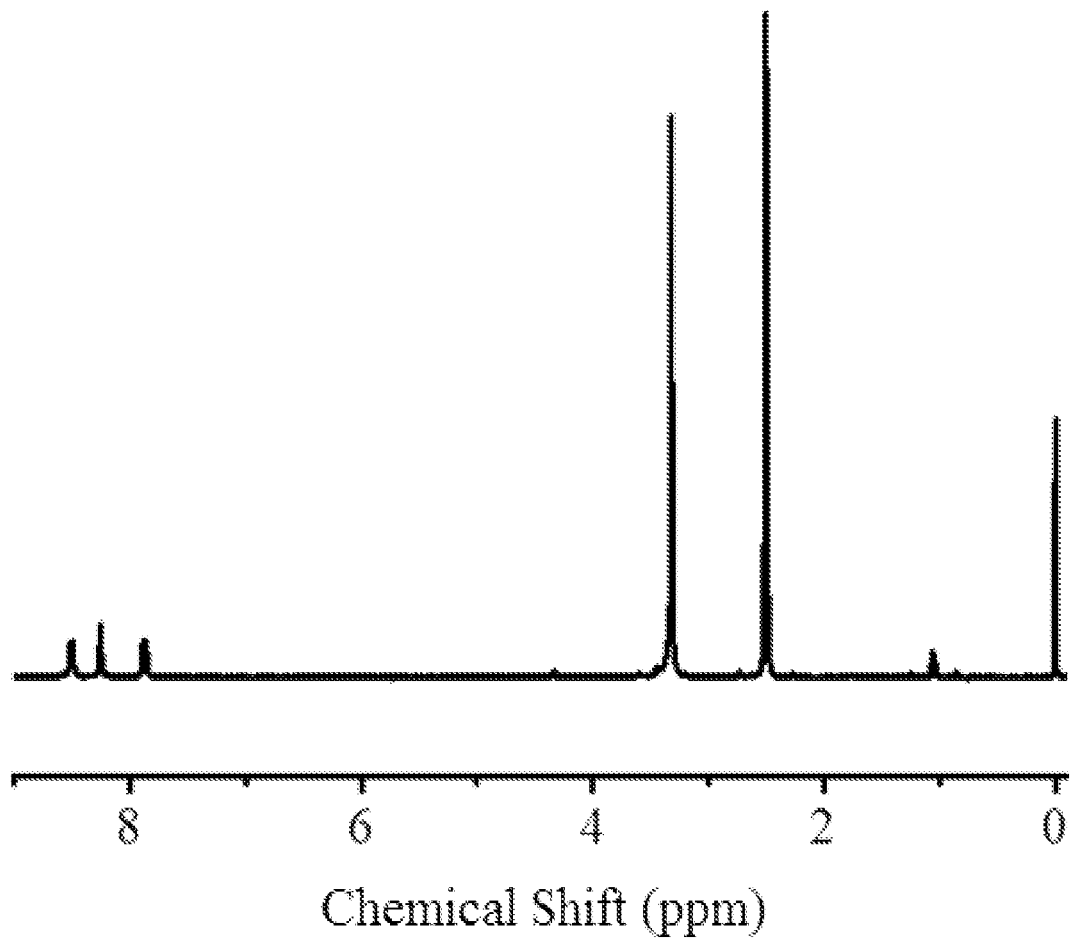
FIG. 1 shows the test result of ZnTNPc by $^1$H NMR.
Figure 2:
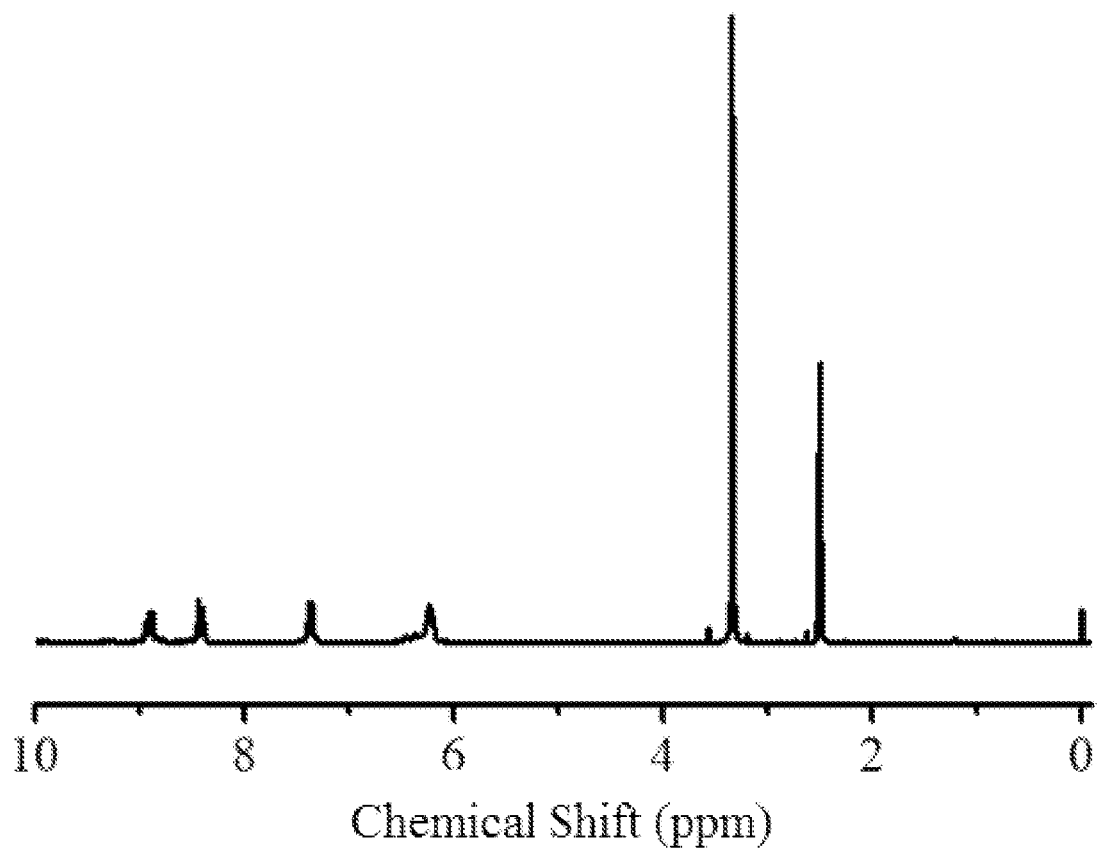
FIG. 2 shows the test result of ZnTAPc by $^1$H NMR.
Figure 3:
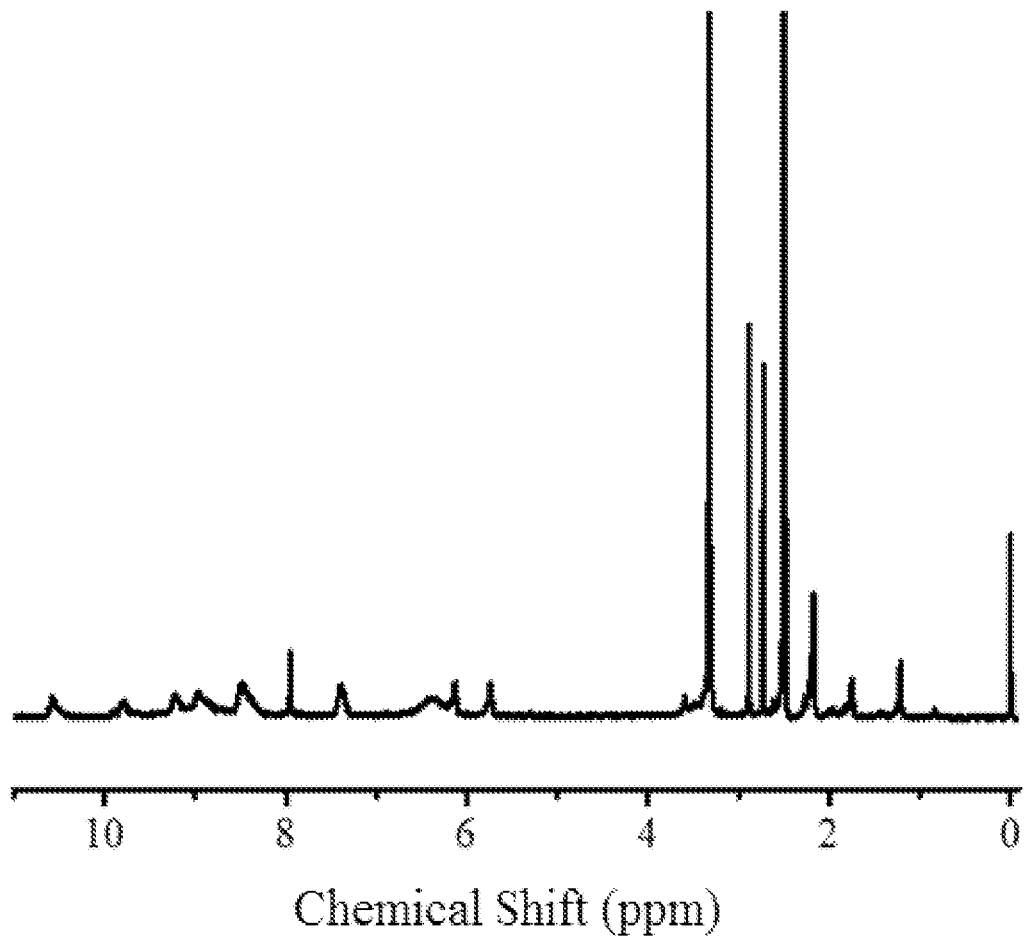
FIG. 3 shows the test result of ZnTAPc-MAm by $^1$H NMR.
Figure 4:
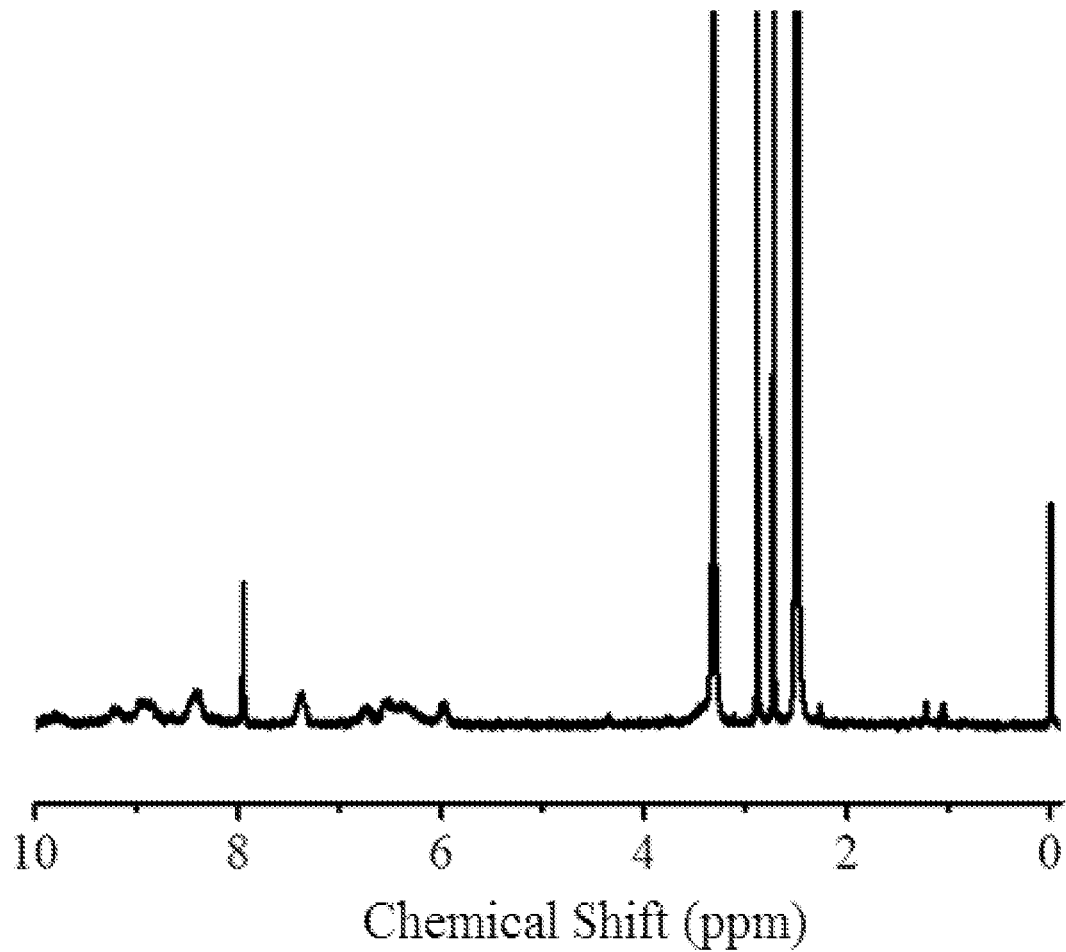
FIG. 4 shows the test result of ZnTAPc-Am by $^1$H NMR.
Figure 5:
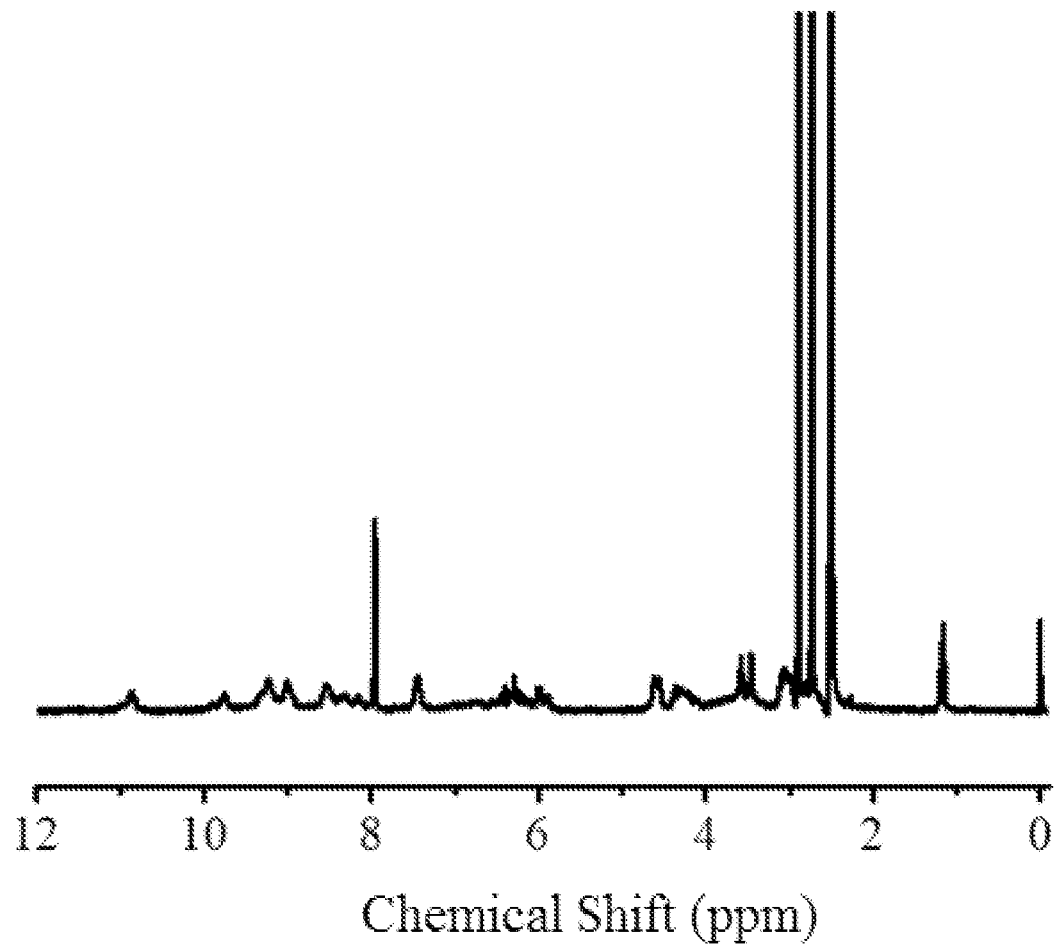
FIG. 5 shows the test result of ZnTAPc-A by $^1$H NMR.

The specific embodiments of the present invention will be described in further detail with reference to embodiments. The following embodiments are intended to illustrate the present invention, instead of limiting the scope of the present invention.

In the following examples of the present invention, the raw materials MMA, PEGMA, and PEGA used need to be passed through a neutral alumina column to remove the polymerization inhibitor, and then placed in the upper part of the refrigerator for storage. Other reagents can be used directly after they are obtained commercially. As a control, ZnTNPc is used as a catalyst, which has a structural formula below:

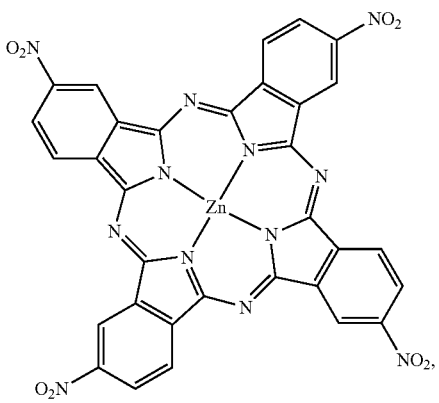

ZnTNPc

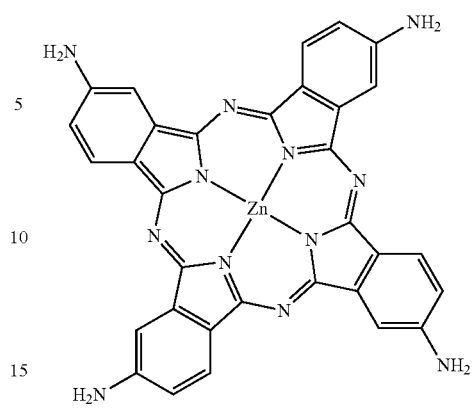

ZnTAPc

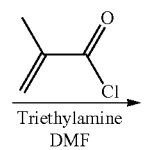

Triethylamine
DMF

In the present invention, the following test methods are used:

1. The number average molecular weight ($M_{n,GPC}$) and molecular weight distribution ($M_w/M_n$) of the obtained polymer are measured by TOSOH HLC-8320 gel permeation chromatograph equipped with a refractive index detector (TOSOH). The guard column used is TSK gel Super MP-N (4.6×20 mm). The detection column is TSK gel Super HZ-N (4.6×150 mm), DMF (with 0.1 wt % LiBr added as a co-solvent) is used as an eluent, the test temperature is 40° C., the flow rate is 0.35 mL·min$^{-1}$, and the molecular weight is in the range of $5×10^2$–$5×10^5$ g·mol$^{-1}$. The TOSOH plus autosampler is used to inject the sample for gel permeation chromatography, and the standard PS sample purchased from TOSOH is used to calibrate the test result of the polymer. The sample for GPC test is prepared as follows. The polymer is dissolved in DMF (with 0.1 wt % LiBr added as a co-solvent) to give a concentration of 1-5 mg/mL. The polymer solution is passed through a small column of neutral alumina and a syringe fitted with 0.45 m filter. Finally, the neat polymer solution is injected into a test vial.

2. The NMR spectra of the obtained products and polymers are measured by Bruker 300 MHz NMR machine, where CDCl$_3$ or DMSO-d$_6$ is used as a deuterated reagent, the test occurs at room temperature (25° C.), and tetramethylsilane (TMS) is used as an internal standard.

3. UV-vis is measured by Shimadzu UV-2600 ultraviolet-visible spectrophotometer, where water or toluene is used as a solvent.

Example 1. Synthesis of Polymerizable Zinc Phthalocyanine Dye Near-Infrared Photocatalyst ZnTAPc-MAm A zinc tetraaminophthalocyanine dye (ZnTAPc) (0.32 g, 0.50 mmol) was dissolved in DMF (20 mL), added with TEA (83.4 μL, 0.60 mmol), and stirred on a magnetic stirrer. Then a mixed solution of methacryloyl chloride (44.8 μL, 0.55 mmol) and anhydrous dichloromethane (10 mL) was added dropwise, and stirred at room temperature overnight. Then the reaction solution was poured into water (150 mL), and the solid product was separated and collected by filtration under suction, and further purified by washing with 1.0 M hydrochloric acid and 1.0 M sodium hydroxide, respectively. Finally, the product was precipitated by washing with deionized water and centrifuged at a speed of 10000 r·min$^{-1}$. The resulting dark blue-black product was dried in a vacuum drying oven before use. The reaction route was as follows:

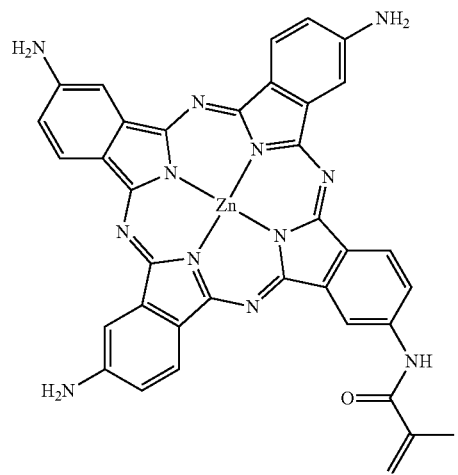

ZnTAPc-MAm

Example 2. Synthesis of Polymerizable Zinc Phthalocyanine Dye Near-Infrared Photocatalyst ZnTAPc-Am ZnTAPc (0.32 g, 0.50 mmol) was dispersed in DMF (20 mL), added with TEA (83.4 μL, 0.60 mmol), and stirred on a magnetic stirrer. Then a mixed solution of acryloyl chloride (53.2 μL, 0.55 mmol) and anhydrous dichloromethane (10 mL) was added dropwise, and stirred at room temperature overnight. Then the reaction solution was poured into water (150 mL), and the solid product was separated and collected by filtration under suction, and further purified by washing with 1.0 M hydrochloric acid and 1.0 M sodium hydroxide, respectively. Finally, the product was precipitated by washing with deionized water and centrifuged at a speed of 10000 r·min$^{-1}$. The resulting dark blue-black product was a zinc phthalocyanine dye monomer-acrylamide (ZnTAPc-Am), which was dried in a vacuum drying oven, and the yield of the product was 80.2%. The reaction route was as follows:

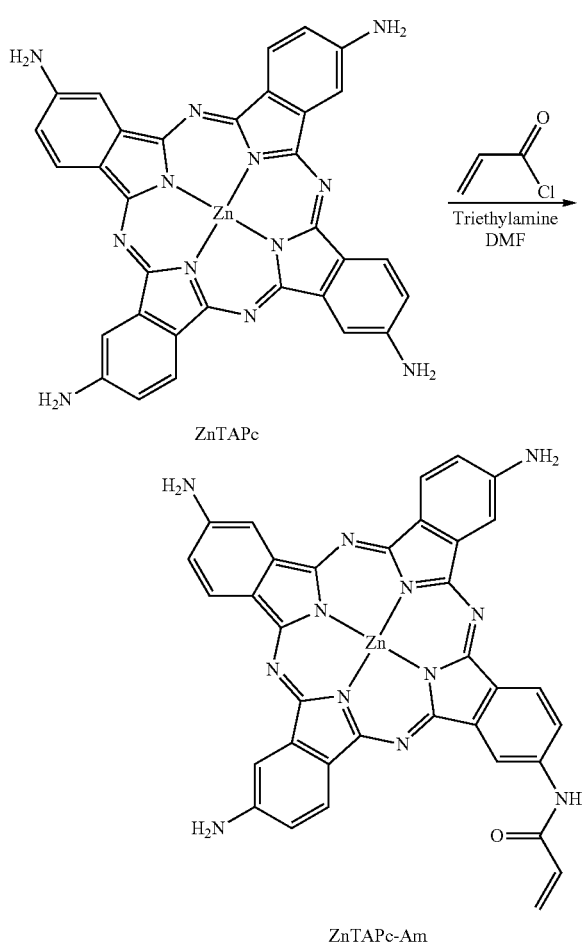

ZnTAPc-Am

Example 3. Synthesis of Polymerizable Zinc Phthalocyanine Dye Near-Infrared Photocatalyst ZnTAPc-A (1) Synthesis of acid chloride compound (acrylic acid-3-chloro-3-oxopropyl ester): 3-(acryloyloxy)propionic acid (79.30 mg, 0.55 mmol) was reacted with thionyl chloride (5.0 mL), and then two drops of DMF was dripped as a catalyst and stirred for 30 min. Excess thionyl chloride was removed by rotary evaporation, and the residue was left and sealed directly for the next reaction. The reaction route was as follows:

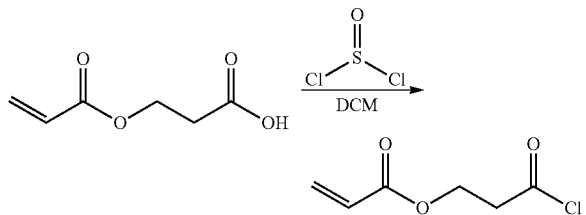

(2) Synthesis of ZnTAPc-A: ZnTAPc (0.32 g, 0.50 mmol) was dissolved in DMF (20 mL), added with TEA (83.4 μL, 0.60 mmol), and stirred on magnetic stirrer. Then a mixed solution of acrylic acid-3-chloro-3-oxypropyl ester (89.40 mg, 0.55 mmol) and anhydrous dichloromethane (10.0 mL) was added dropwise, and stirred at room temperature overnight. Then the reaction solution was poured into water (150 mL), and the solid product was separated and collected by filtration under suction, and further purified by washing with 1.0 M hydrochloric acid and 1.0 M sodium hydroxide, respectively. Finally, the product was precipitated by washing with water and centrifuged at a speed of 10000 r·min$^{-1}$. The resulting dark blue-black product was a zinc phthalocyanine dye monomer-acrylate (ZnTAPc-A), which was dried in a vacuum drying oven, and the yield of the product was 85.6%. The reaction route was as follows:

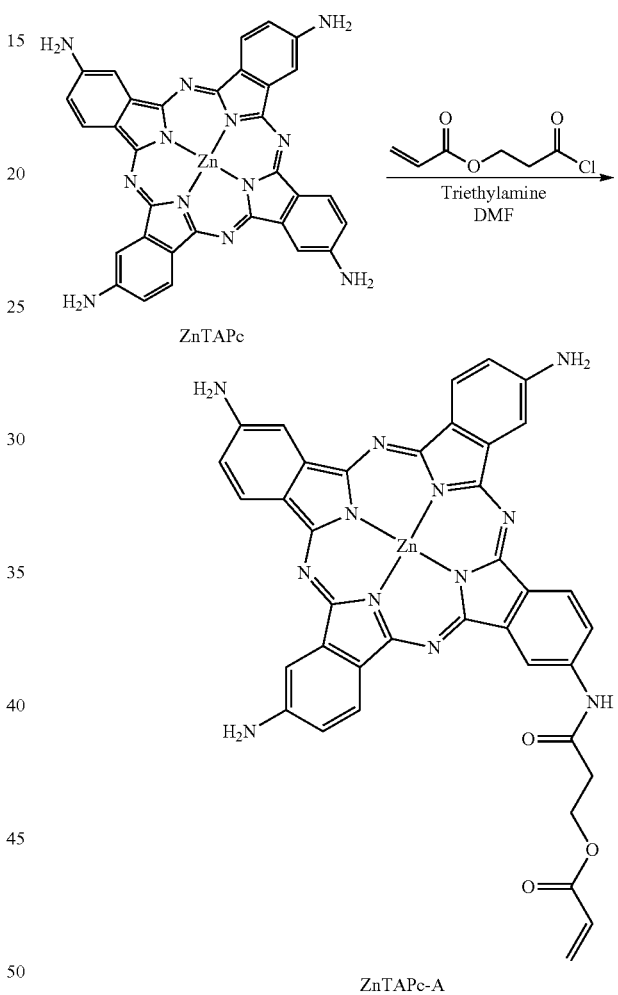

ZnTAPc-A

Example 4: Preparation of Polymethyl Methacrylate

According to Table 1, with various polymerizable monomers and catalysts, RAFT polymerization was carried out under the same reaction conditions under near-infrared light of 730 nm. Taking No. 7 as an example, the reaction steps were as follows:

The zinc phthalocyanine dye ZnTAPc-MAm synthesized above was used as the near-infrared photocatalyst. At a molar ratio of [PEGMA]$_0$/[CDSPA]$_0$/[TEA]$_0$/[ZnTAPc-MAm]$_0$=15/1/1/0.01, PEGMA (177.0 mg, 0.354 mmol), CDSPA (9.50 mg, 0.0236 mmol), TEA (1.7 μL, 0.0236 mmol), and zinc phthalocyanine monomer ZnTAPc-MAm (0.18 mg, 0.237 μmol) were added to a dried 2.0 mL ampoule fitted with a stir bar, and 0.5 mL of DMSO was added as a polymerization solvent. Then the mouth of the ampoule was sealed with plastic wrap to prevent volatilization of monomer and pollution. The ampoule was positioned in a magnetic stirrer and the content was polymerized at room temperature under irradiation with near-infrared LED light (66.3 mW·cm$^{-2}$) having a center wavelength of 730 nm for a set period of time. After the polymerization reaction, the reaction mixture was taken out and dissolved in THF (2.0 mL), and then petroleum ether (180 mL) was added for precipitation. The polymer product was collected by filtration and dried to a constant weight at 30° C. under vacuum. Then, the polymerization conversion rate was calculated according to the gravimetric method.

The polymerization results are shown in Table 1.

TABLE 1

RAFT polymerization under near-infrared light of 730 nm in the air[a]

| No. | Molar ratio | Monomer | Catalyst | Time (h) | Conversion rate (%)[b] | $M_{n,th}$[c] (g·mol$^{-1}$) | $M_{n,GPC}$ (g·mol$^{-1}$) | $M_w/M_n$ |
|---|---|---|---|---|---|---|---|---|
| 1 | 200/1/1/0.01 | MMA | ZnTAPc | 5 | 84.6 | 17300 | 28700 | 1.07 |
| 2[d] | 200/1/1/0.01 | MMA | ZnTNPc | 5 | 68.0 | 14000 | 24900 | 1.07 |
| 3[e] | 164/1/1/0.01 | MMA | ZnTAPc | 21 | 85.6 | 14500 | 11700 | 1.34 |
| 4 | 164/1/1/0.01 | MMA | ZnTAPc | 5 | 66.7 | 11400 | 8600 | 1.35 |
| 7 | 15/1/1/0.01 | PEGMA | ZnTAPc-MAm | 21 | 70.1 | 5700 | 9600 | 1.35 |
| 8[f] | 70/1/1/0.01 | NIPAAm | ZnTNPc-MAm | 21 | 63.4 | 5300 | 8100 | 1.12 |
| 9[f] | 75/1/1/0.01 | NIPAAm | ZnTNPc-A | 5 | 74.7 | 6700 | 9200 | 1.13 |

[a]Polymerization conditions: Molar ratio = [polymerizable monomer]$_0$/[CDSPA]$_0$/[TEA]$_0$/[zinc phthalocyanine catalyst]$_0$, $V_{polymerizable\ monomer}$ = 0.5 mL, $V_{DMSO}$ = 0.5 mL, and polymerization under near-infrared LED light source($\lambda_{max}$ = 730 nm, 66.3 mW·cm$^{-2}$) in the air at 25° C.
[b]D conversion rate calculated by the weighing method.
[c]$M_{n,th}$ = [Monomer]$_0$/[CDSPA]$_0$ × $M_{w,Monomer}$ × Conv. % + $M_{w,CDSPA}$
[d]reaction under argon atmosphere.
[e]$V_{DMI}$ = 0.5 mL.
[f]molar ratio = [polymerizable monomer]$_0$/[CDCT]$_0$/[TEA]$_0$/[zinc phthalocyanine catalyst]$_0$ was polymerized at room temperature under irradiation with near-infrared LED light (66.3 mW·cm$^{-2}$) having a center wavelength of 730 nm for 24 h. After the polymerization reaction, the reaction mixture was taken out and dissolved in THF (2.0 mL), and then anhydrous diethyl ether (180 mL) was added for precipitation. The polymer product was collected by filtration and dried to a constant weight at 30° C. under vacuum. The reaction results are shown in Table 2.

TABLE 2

RAFT polymerization under near-infrared light of 730 nm in the air

| Conv. (%)[b] | $M_{n,th}$[c] (g·mol$^{-1}$) | $M_{n,GPC}$ (g·mol$^{-1}$) | $M_w/M_n$ |
|---|---|---|---|
| 80.5 | 8000 | 7800 | 1.30 |

Although a polymerization product is also obtained in the experimental group No. 1-No. 4, because the catalyst zinc phthalocyanine dye used does not contain a carbon-carbon double bond and is not polymerizable, the polymerization product obtained in the experimental group No. 1-No. 4 cannot be used again as a photocatalyst for subsequent reactions. In the experimental group No. 7-No. 9, a polymerizable zinc phthalocyanine dye is used as a catalyst, and the molecular structure of the zinc phthalocyanine dye is introduced into the polymerization product, which can be used as a macromolecular chain transfer reagent for subsequent polymerization reactions by using its photocatalytic performance.

Example 5: Cyclic Polymerization Experiment Catalyzed with Zinc Phthalocyanine Dye Catalyst of Example 2

Figure 6:
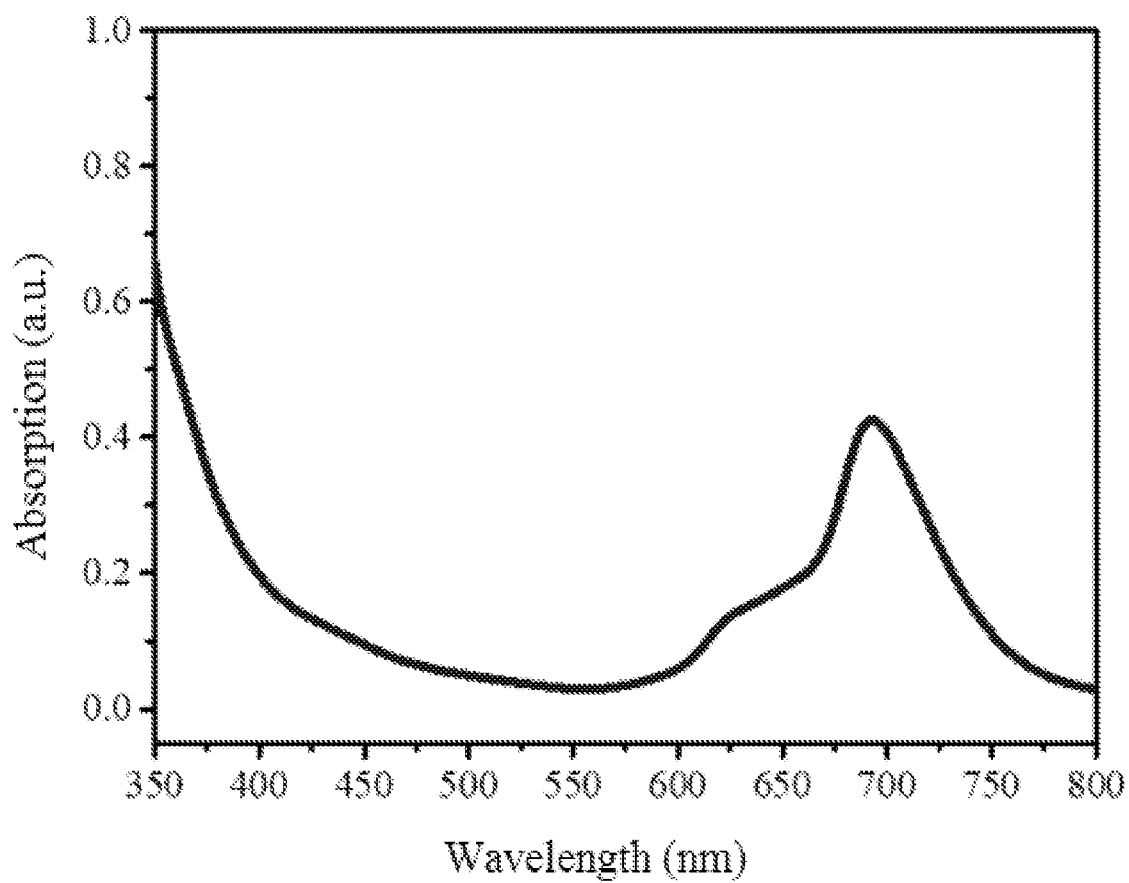
FIG. 6 shows a UV-visible absorption spectrum of polymer P(PEGA-co-DMAEA) in methanol as a solvent.

The polymerizable zinc phthalocyanine dye ZnTAPc-Am synthesized above was used as a near-infrared photocatalyst, and the organic amine structure-containing monomer DMAEA was used as a cocatalyst. At a molar ratio of [PEGA]$_0$/[CEPTA]$_0$/[DMAEA]$_0$/[ZnTAPc-Am]$_0$=20/1/2/0.02, PEGA (0.50 mL, 1.11 mmol), CEPTA (14.7 mg, 0.0557 mmol), DMAEA (16.9 µL, 0.111 mmol), and the zinc phthalocyanine dye monomer ZnTAPc-Am (0.77 mg, 1.11 µmol) were added to a dried 2.0 mL ampoule fitted with a stir bar, and 0.5 mL of DMSO was added as a polymerization solvent. Then the mouth of the ampoule was sealed with plastic wrap to prevent volatilization and pollution. The ampoule was positioned in a magnetic stirrer and the content The polymer obtained by the above polymerization is designated as P(PEGA-co-DMAEA). The polymer has good water solubility. To verify that the vinyl zinc phthalocyanine monomer ZnTAPc-Am was successfully polymerized and the catalyst molecules were retained and immobilized in a small amount of polymer chains, the obtained polymer was more rigorously purified. The prepared P(PEGA-co-DMAEA) polymerization reaction solution was dialyzed in an aqueous solution for 48 h, and then centrifuged to collect the upper liquid, which was freeze-dried to obtain the purified polymer P(PEGA-co-DMAEA). Through this process, the ZnTAPc-Am catalyst monomer that has not been polymerized into the polymer chain was removed. In the polymer P(PEGA-co-DMAEA), the organic amine cocatalyst was also immobilized and retained. Similarly, the purified polymer was characterized by ultraviolet-visible absorption spectroscopy. As shown in FIG. 6, Obvious absorption appears around 700 nm, confirming the existence of zinc phthalocyanine dye structure.

To verify that P(PEGA-co-DMAEA) has reusable catalytic performance and polymerization activity, P(PEGA-co-DMAEA) was used as a macromolecular chain transfer reagent in a living chain extension experiment to prepare a block polymer. During the process, no zinc phthalocyanine dye and organic amine cocatalyst were added again. The reaction steps were as follows.

NiPAAm or PEGA was used as the polymerization monomer for the second polymerization reaction. P(PEGA-co-DMAEA) and the polymerization monomer was dissolved in a solvent, and the polymerization reaction was carried out in a sealed tube in the air at room temperature under near-infrared light for a certain period of time. The solution was removed and precipitated with diethyl ether to obtain a polymer. The results are shown in Table 3. As shown in Table 3, P(PEGA-co-DMAEA) can be used to synthesize a block copolymer in DMSO or water solvent, confirming the secondary catalytic effect of the zinc phthalocyanine dye catalyst.

TABLE 3

Chain extension and polymerization of different monomers using P(PEGA-co-DMAEA) as macromolecular chain transfer reagent

| No. | Molar ratio | Monomer | Solvent (mL) | Time (h) | $M_{n,GPC}$ (g · mol$^{-1}$) | $M_w/M_n$ |
|---|---|---|---|---|---|---|
| 1 | 110/1 | NiPAAm | DMSO (0.40) | 1.0 | 28100 | 1.60 |
| 2 | 25/1 | PEGA | DMSO (0.40) | 2.0 | 26200 | 1.58 |
| 3 | 25/1 | PEGA | H$_2$O (0.40) | 2.0 | 19200 | 1.44 |

$^a$Polymerization conditions: Molar ratio=[polymerizable monomer]$_0$/[P(PEGA-co-DMAEA)]$_0$, and polymerization under near-infrared LED light source ($\lambda_{max}$=730 nm, 66.3 mW·cm$^{-2}$) in the air at 25° C. m$_{P(PEGA-co-DMAEA)}$=0.17 g, P(PEGA-co-DMAEA) ($M_{n,GPC}$=7800 g·mol$^{-1}$, $M_w/M_n$=1.30).

Figure 7:
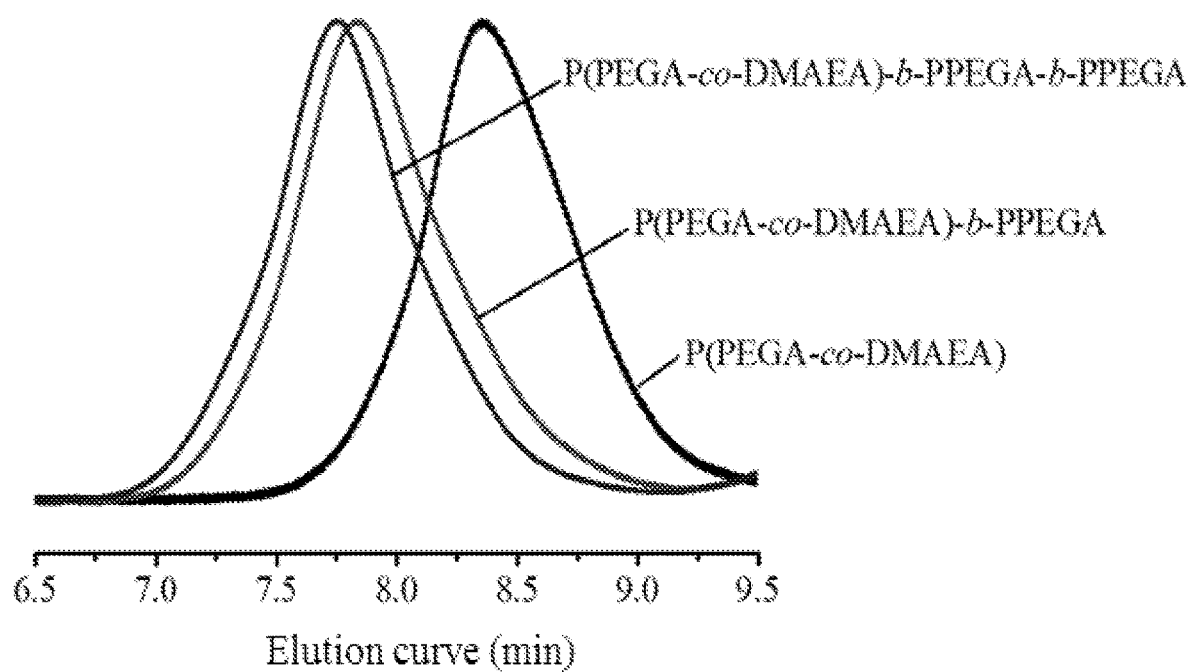
FIG. 7 shows an elution curve by GPC of the polymer prepared by three-cycle of photocatalysis by a zinc phthalocyanine dye.

The block copolymer P(PEGA-co-DMAEA)-b-PPEGA obtained in the experimental group No. 3 in Table 3 was used as a macromolecular chain transfer reagent, and PEGA was used as the polymerization monomer for the third polymerization reaction. Following the same process, the chain extension and polymerization was performed again to verify the tertiary catalytic effect of the zinc phthalocyanine dye catalyst. The reaction conditions are shown in Table 4. A triblock polymer is also obtained in the reaction. The elution curves by GPC of the polymerization products P(PEGA-co-DMAEA), P(PEGA-co-DMAEA)-b-PPEGA, and P(PEGA-co-DMAEA)-b-PPEGA-b-PPEGA obtained by using the zinc phthalocyanine dye in the first and following cyclic catalysis are shown in FIG. 7.

TABLE 4

Chain extension and polymerization using P(PEGA-co-DMAEA)-b-PPEGA as macromolecular chain transfer reagent

| Molar ratio | Solvent (mL) | Time (h) | $M_{n,GPC}$ (g · mol$^{-1}$) | $M_w/M_n$ |
|---|---|---|---|---|
| 20/1 | H$_2$O (0.40) | 12 | 23800 | 1.44 |

$^a$Polymerization conditions: Molar ratio=[PEGA]$_0$/[P(PEGA-co-DMAEA)-b-PPEGA]$_0$, polymerization under near-infrared LED light source ($\lambda_{max}$=730 nm, 66.3 mW·cm$^{-2}$) in the air at 25° C., V$_{PEGA}$=0.10 mL, P(PEGA-co-DMAEA)-b-PPEGA ($M_{n,GPC}$=19200 g·mol$^{-1}$, $M_w/M_n$=1.44).

In the present invention, the polymerization monomer used may also be other methacrylate monomers than those in the above examples, and the same results and conclusions can be obtained by using the same polymerization method.

In summary, a new polymerizable zinc phthalocyanine dye structure of the present invention is used as a near-infrared photocatalyst to realize the near-infrared light-controlled polymerization of (meth)acrylate monomers and (meth)acrylamide monomers by direct polymerization in the air without oxygen removal. As a result, a variety of polymer structures with a controllable molecular weight and a molecular weight distribution of 1.07-1.5 are obtained. In the present invention, a near-infrared light-responsive functional zinc phthalocyanine dye is used as a near-infrared photocatalyst for the polymerization reaction, with which polymers of a variety of structures can be directly prepared in the air without oxygen removal. The polymerization process has the characteristics of "living" radical polymerization. At the same time, the polymerizable zinc phthalocyanine dye remains on the polymer chain by polymerization, thereby realizing the cyclic utilization of the near-infrared photocatalyst.

While preferred embodiments of the present invention have been described above, the present invention is not limited thereto. It should be appreciated that some improvements and variations can be made by those skilled in the art without departing from the technical principles of the present invention, which are also contemplated to be within the scope of the present invention.

What is claimed is:

1. A near-infrared light-controlled living radical polymerization method, comprising steps of:

subjecting a free radical polymerizable monomer to a near-infrared light-controlled polymerization reaction, in the presence of a chain transfer agent, a cocatalyst and a zinc phthalocyanine dye with a carbon-carbon double bond as a catalyst, in a solvent at 0-30° C. under the air atmosphere, to obtain a living radical polymerization product after complete reaction, wherein the free radical polymerizable monomer is selected from an acrylate monomer, a methacrylate monomer, an acrylamide monomer or a methacrylamide monomer;

the chain transfer agent comprises a thiocarbonate;

the cocatalyst comprises an organic amine with a carbon-carbon double bond or an organic amine without a carbon-carbon double bond; and the living radical polymerization product has a structure of Formula (1) or (2):

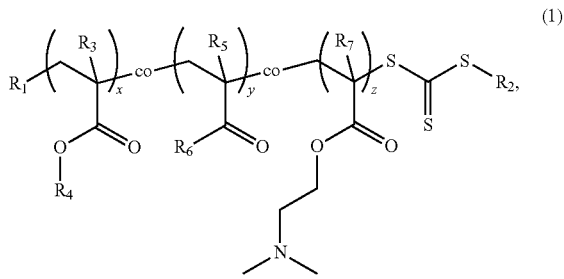

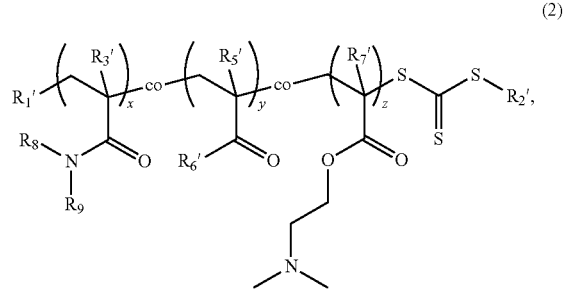

in which co represents a random copolymer;

R$_1$ and R$_1$' are each independently selected from the group consisting of

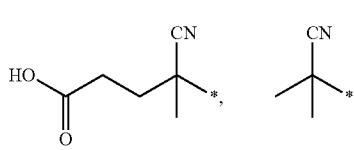 and

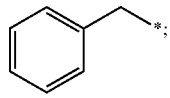

$R_2$ and $R_2'$ are each independently selected from a C2-C12 alkyl group or a C2-C12 alkyl group substituted with carboxyl;

$R_3$, $R_3'$, $R_5$ and $R_5'$ are each independently selected from hydrogen or methyl;

$R_4$ is selected from benzyl, a C1-C6 alkyl group, a C1-C6 alkyl group substituted with hydroxyl, a polyethylene glycol chain, a C1-C6 alkylene oxide, or a C1-C6 alkyl group substituted with dimethylamino;

$R_6$ and $R_6'$ are each independently selected from

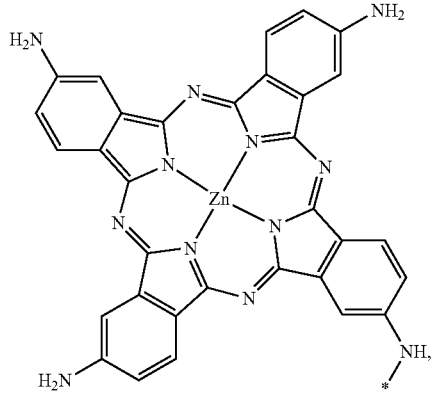

or

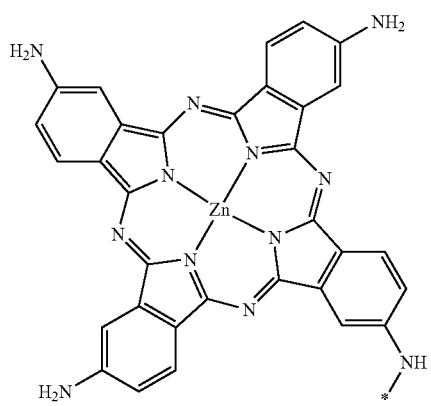

-continued

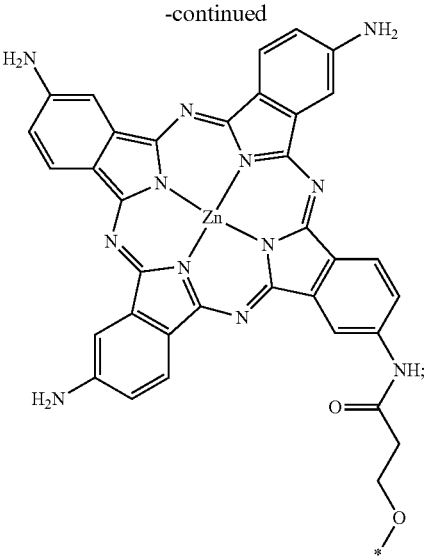

$R_7$ and $R_7'$ are each independently selected from hydrogen or methyl;

$R_8$ and $R_9$ are each independently selected from hydrogen, a C1-C6 alkyl group, or a C1-C6 alkyl group substituted with hydroxyl; and X=3-1000; y is lower than 10; and z=0-20.

2. The living radical polymerization method according to claim 1, wherein when z=0, the cocatalyst is an organic amine without a carbon-carbon double bond; and the organic amine without a carbon-carbon double bond is triethylamine and/or tributylamine.

3. The living radical polymerization method according to claim 1, wherein when z=1–20, the cocatalyst comprises an organic amine with a carbon-carbon double bond; and the organic amine with a carbon-carbon double bond is dimethylaminoethyl acrylate and/or dimethylaminoethyl methacrylate.

4. The living radical polymerization method according to claim 1, wherein $R_2$ and $R_2'$ are each independently selected from the group consisting of ethyl, n-dodecyl, and —CH$_2$CH$_2$COOH.

5. The living radical polymerization method according to claim 1, wherein $R_4$ is selected from the group consisting of: —CH$_3$,

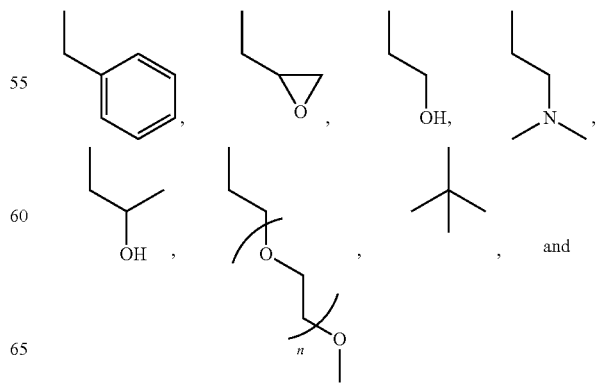

-continued

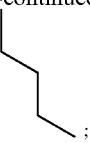

in which n=5-22.

6. The living radical polymerization method according to claim 1, wherein $R_8$ and $R_9$ are each independently selected from the group consisting of hydrogen, methyl, ethyl, isopropyl and 2-hydroxypropyl.

7. The living radical polymerization method according to claim 1, wherein the molar ratio of the free radical polymerizable monomer to the zinc phthalocyanine dye is 1:0.00001-0.01.

8. The living radical polymerization method according to claim 1, wherein the molar ratio of the thiocarbonate to the cocatalyst is 1:0.5-20.

9. The living radical polymerization method according to claim 1, wherein the near-infrared light-controlled polymerization reaction takes place at a near-infrared light with a wavelength of 650-900 nm.

10. A living radical polymerization product prepared by the method according to claim 1, having a molecular weight of 1000-200000 g/mol and a molecular weight distribution of 1.07-1.5.

* * * * *